May 17, 1960 K. J. AVERSTEN 2,936,981
SOLDER ATTACHED CABLE CLAMP
Filed Nov. 12, 1954
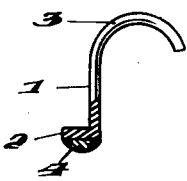
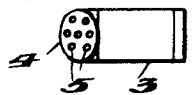
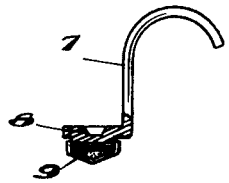
Fig.1. Fig.2. Fig.4.
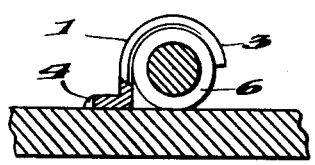
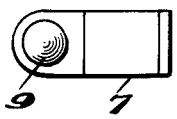
Fig.3. Fig.5.
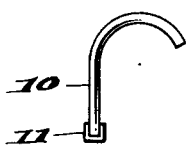
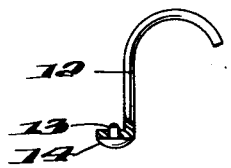
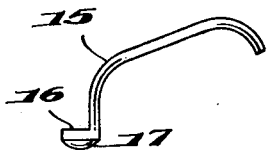
Fig.6. Fig.7. Fig.8.
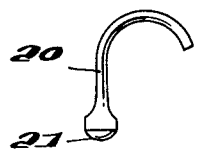
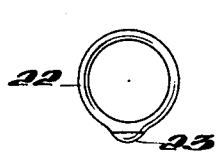
Fig.9. Fig.10. Fig.11.
INVENTOR
KARL JOEL AVERSTEN,
BY Robert B Pearson
ATTORNEY

United States Patent Office 2,936,981
Patented May 17, 1960

2,936,981
SOLDER ATTACHED CABLE CLAMP

Karl Joel Aversten, Lidingo, Sweden, assignor to Svenska Aktiebolaget Gasaccumulator, Lidingo, near Stockholm, Sweden, a corporation of Sweden Application November 12, 1954, Serial No. 468,519

Claims priority, application Sweden May 22, 1954

1 Claim. (Cl. 248—74)

The present invention relates to a method of attaching a metal clamp to a metal object in order to keep an electric cable, wire, bar, tube, band, plate or the like against this object.

Such clamps are usually attached so that the clamp as well as the metal object are provided with apertures, a threaded bolt is inserted through said apertures, and a nut is tightened on the bolt against the clamp or a washer which may be placed on the bolt. Sometimes the perforation of the metal object is avoided by welding one end of a threaded stud to the metal object, but the usual execution is such as described above with clamp provided with aperture, nut and, possibly, washer. Even if a rivet is used for the fastening, apertures are required both in the clamp and in the metal object. Thus, these methods of attaching the clamp demand not only several parts but are also time-consuming.

The above mentioned disadvantages are removed by attaching the clamp in the way intended by the present invention. A metal clamp is provided with a soldering metal coating on the portion intended to be joined to a metal object, the clamp is fixed in a current supply tool, suitably a welding gun, and is directed to the intended spot on the metal object, current is supplied to the clamp, so that an arc is formed between the soldering metal coating and the metal object and causes the soldering metal coating to melt, and thereafter the part of the clamp coated with soldering metal is by means of the tool holding the clamp pressed down into melted soldering metal on the metal object at the same time as the current supply is interrupted. The clamp then, in connection with the solidification of the soldering metal, becomes rigidly fixed to the metal object. According to the invention the metal clamp provided with soldering metal on one side of the portion intended for fastening to the metal object, this portion being rigidly fixed to the clamp part.

The invention will now be explained in connection with the description of some forms of execution of metal clamps according to the invention as shown in the accompanying drawings. Figs. 1–3 show a clamp in side view and from below, respectively, and in side view but fixed to a metal object. Figs. 4 and 5 show another clamp in side view and from below, respectively. Figs. 6–11 show side views of various forms of clamps.

According to Figs. 1–3 a clamp 1, for instance of iron or another metal, is provided with an essentially plane fixing part 2 and a curved holder part 3. At the base of the fixing part 2 a soldering metal 4, for instance of silver solder, harder silver solder, copper solder, welding bronze or another such metal with lower fusing point than the fusing point of the clamp, is fastened, for instance by means of soldering, welding, pasting or the like. In the outer surface of the soldering metal 4 hollow notches 5 are suitably made, filled with a flux, such as chlorides, fluorides and borate of alkaline metals.

The clamp 1 is inserted into a current carrying tool, for instance a welding gun with the soldering metal coating 4 turned outwards. Thereafter the clamp 1 is, by means of the gun, directed on and kept to the spot on a metal surface where the clamp is to be fastened, current is supplied and the gun pulls the soldering metal coating 4 a short distance from the metal surface, whereby an arc is created between the soldering metal coating 4 and the metal surface so that soldering metal and flux are melting. The current is interrupted and simultaneously the fixing part 2 of the clamp 1 is pressed down into the melted soldering metal deposited at the surface of the metal object, the melted soldering metal then immediately solidifying and forming a fixed connection between the metal object and the clamp, as shown by Fig. 3. The object, for instance an electric cable 6 which is to be kept by the clamp, is inserted into the clamp, the curved part 3 of which is then knocked down around the cable by means of for instance a hammer.

In this way it is thus possible easily and conveniently to fasten metal clamps anywhere on a metal surface, without having to provide this surface with apertures or the like and without the use of such machine elements as studs with nuts, rivets, screws or the like.

According to Figs. 4 and 5 the fixing part 8 of a clamp 7 is cylindrically formed, and on this part a soldering metal loading 9, consisting of a container of soldering metal filled with flux, is fastened.

Fig. 6 shows a clamp 10 with flux filled, bowl-shaped soldering metal coating 11.

Fig. 7 shows a clamp 12, the fixing part 13 of which is provided with an aperture, and a soldering metal piece 14 is firmly riveted to the fixing part. The soldering metal piece is suitably provided with flux in one way or another.

Fig. 8 shows a clamp 15, which is of a length so that it can be used for keeping two (or more) cables or the like. One end of the clamp 15 is then provided with a fixing part 16 and soldering metal coating 17. However, it is also possible to have the two ends of the clamp 15 provided with a fixing part and soldering metal coating, the two soldering metal coatings of the same clamp then being supplied with current and being melted simultaneously.

Figs. 9 and 10 show clamps 18 and 20, respectively, the longitudinal directions of which are more or less circular, a soldering metal coating 19 or 21, respectively, being applied at one end of the clamp 18 or 20, respectively.

Fig. 11 shows a clamp 22 in the form of a totally closed ring with a soldering metal coating 23 at one place on its outer side.

From the above described embodiments seems to be evident that the clamp provided with soldering metal coating may be executed in a number of different ways, considerably exceeding the described ones, whereby the method according to the invention may be used for fastening of highly different clamps. By clamp shall hereby be understood various kinds of holders, which have to keep or support an object.

What is claimed is:

A metal clamp for attachment directly to a metallic surface by the use of electric arc techniques comprising a substantially flat base portion terminating in a curved holder portion, said base portion having a substantially plane upper face for abutting engagement with a current supplying tool and a lower face having formed thereon a protuberance adapted to receive a cap, and a cap of soldering metal of lower melting point than that of said clamp overlying and adhering to said protuberance, said cap containing flux and being meltable in an electric arc so as to form a joint between said clamp and the metallic surface.

(References on following page)

References Cited in the file of this patent

UNITED STATES PATENTS

| | | |
|---|---|---|
| 1,476,836 | Pleister | Dec. 11, 1923 |
| 1,981,973 | Tinnerman | Nov. 27, 1934 |
| 2,402,659 | Nelson | June 25, 1946 |
| 2,506,747 | Smith | May 9, 1950 |
| 2,711,915 | Aversten | June 28, 1955 |

OTHER REFERENCES

"The Nelson Electric Arc Welder and Flux Filled Studs," Sales Pamphlet, published by Nelson Sales Corporation, Lorain, Ohio.